United States Patent [19]

Oelrich et al.

[11] 4,361,073
[45] Nov. 30, 1982

[54] SUB-CRITICAL TIME MODULATED CONTROL MECHANISM

[75] Inventors: John A. Oelrich, Avon; Albert J. Divigard, Waterbury, both of Conn.

[73] Assignee: Chandler Evans Inc., West Hartford, Conn.

[21] Appl. No.: 452,050

[22] Filed: Mar. 18, 1974

[51] Int. Cl.³ .............................................. F15B 13/044
[52] U.S. Cl. ...................................... 91/47; 91/417 R; 244/3.21
[58] Field of Search .................... 91/47, 417; 244/3.21

[56] References Cited

U.S. PATENT DOCUMENTS

| | | | |
|---|---|---|---|
| 3,390,612 | 7/1968 | Wills | 91/417 R |
| 3,430,536 | 3/1969 | Oelrich | 91/47 |
| 3,516,331 | 6/1970 | Oelrich et al. | 91/47 |
| 3,521,535 | 7/1970 | Oelrich | 91/47 |

OTHER PUBLICATIONS

Heathkit Model No. 1G-72, p. 91, Heathkit Catalog 810/50, 1965.
Heathkit Model No. 1G-82, p. 92, Heathkit Catalog 810/50, 1965.
Heathkit Model No. 1G-72, 1GW-72, p. 37, Heathkit Catalog Supplement 800/54, May 1965.
Heathkit Model No. 1G-82, EUW-82, p. 37, Heathkit Catalog Supplement 800/54, May 1965.
Electronic Designs, Models 180, 182, 183 and 195, p. 946, Electronic Engineers Master Catalog, 1964–1965.
Exact Electronics, Inc., Types 240, 250, 251 and 255, p. 963, Electronic Engineers Master Catalog, 1964–1965.
Hewlett-Packard Co., Models 200 AB, 200 CD, 200 J, 200 S, 201 C, 202 A, 202 C, 204 B, 205 AG, 206 A, 207 A, 208 A, 208 A-DB, 241 A and 650 A, p. 995, Electronic Engineers Master Catalog, 1964–1965.
"Servomechanisms and Regulating Systems Design," Chestnut & Mayer, vol. 11, John Wiley & Sons, Inc., New York, N.Y., 1955, pp. 1–4 and 12–33.
"Servomechanism Analysis," Thaler and Brown, McGraw Hill Book Company, Inc., New York, N.Y. pp. 138–140.
"Feedback Control Systems", Gille, Pelegrin and Decaulne, McGraw-Hill Book Co., Inc., New York, N.Y., 1959, pp. 150–154, 475, 544–545 and 547–549.
"Servomechanism Fundamentals," Lever, Lesnick and Matson, McGraw-Hill Book Co., Inc., New York, N.Y., 1947, pp. 83–89 and 215–218.

Primary Examiner—Carlton R. Croyle
Assistant Examiner—Edward Look
Attorney, Agent, or Firm—Fishman and Van Kirk

[57] ABSTRACT

Fluid operated time modulated position control mechanisms are operated with a sub-critical carrier frequency. The carrier frequency is selected to be within a band lying between the minimum critical or natural frequency of an actuator system including the control mechanism and the maximum control signal frequency as determined by the system dynamics. The carrier signal is also selected to provide a dither amplitude sufficient to overcome the coulomb friction of the control mechanism and load.

5 Claims, 1 Drawing Figure

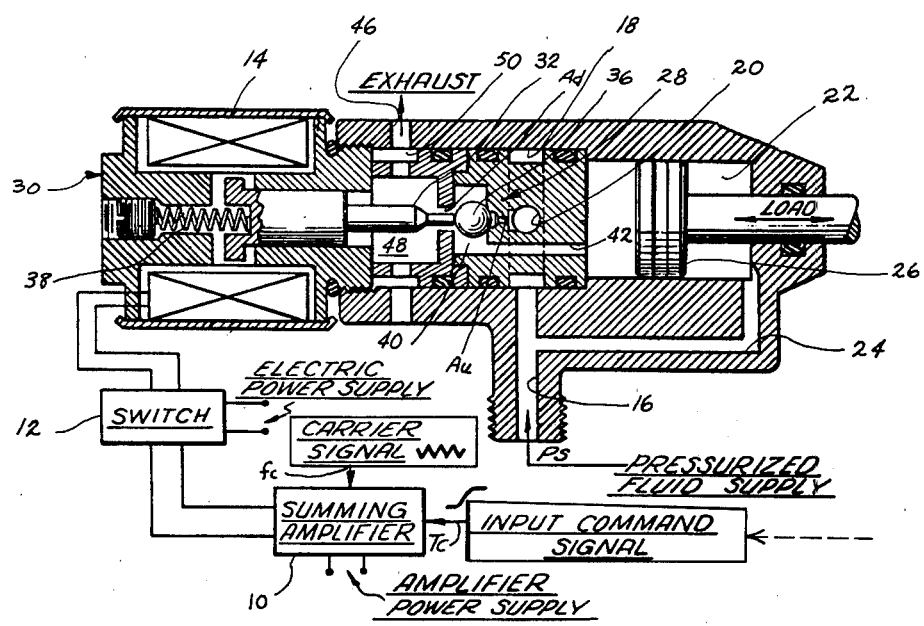

SUB-CRITICAL TIME MODULATED CONTROL MECHANISM

BACKGROUND OF THE INVENTION

(1) Field of the Invention

The present invention relates to time modulated fluidically actuated control mechanisms. More specifically, this invention is directed to a technique which permits the use of such time modulated control mechanisms in environments where the natural frequency of the control mechanism and its load is comparatively high. Accordingly, the general objects of the present invention are to provide novel and improved methods of such character.

(2) Description of the Prior Art

Time modulated control mechanisms are well known in the art. An example of an open loop control mechanism of the time modulated type may be found in U.S. Pat. No. 3,430,536. A similar control mechanism, which is of the closed loop type, is shown and described in U.S. Pat. No. 3,521,535. The disclosures of these two patents are incorporated herein by reference and a full discussion of time modulation as it applies to fluidically actuated control mechanisms will be found in U.S. Pat. No. 3,430,536.

As pointed out in U.S. Pat. No. 3,430,536, and particularly with reference to the description of FIG. 7 of the patent, it has previously been considered necessary to operate time modulated pneumatically actuated control mechanisms with a carrier frequency $f_c$ above the critical range of system natural frequencies; the "dither" amplitude of the control being acceptably small above system resonance due to attenuation of the pressure variations resulting from cycling of the control valve or valves at the carrier frequency. Operation with such a "super-critical" carrier frequency, typically in the range of 80 Hz to 175 Hz, covered most previous control applications. It has been widely believed in the art that operation with a carrier frequency below the range of resonant frequencies of the control system; i.e., operation with a "sub-critical" carrier; would result in a prohibitively large dither amplitude. As used herein, the term "dither" refers to load motion at the carrier, rather than the command, frequency.

To summarize the above, referring again to FIG. 7 of U.S. Pat. No. 3,430,536, a principal objective in the design of time modulated pneumatically actuated control mechanisms is to permit changes in load with a minimum effect on the dither amplitude. The graphical showing of FIG. 7 of U.S. Pat. No. 3,430,536 would indicate to those skilled in the art that this objective could be achieved only by operating with a "super-critical" carrier frequency above the critical range of system natural or resonant frequencies.

The above principals will apply to and do not impede most control applications. There are, however, certain control applications where the load has small inertia and the system natural frequency range is thus considerably higher than previously experienced. In such applications, for example where the system resonant frequency range exceeds 175 Hz, there are substantial impediments to operation with a super-critical carrier frequency. Thus, for example, above approximately 175 Hz the electrical power required for the necessary fast response of an economical solenoid becomes prohibitively large. In fact, for most control applications wherein the system natural frequency range extends above 175 Hz, solenoids which meet system requirements for volumetric efficiency and weight are unavailable. Additionally, as may be seen by reference to FIG. 7 of U.S. Pat. No. 3,430,536, as carrier frequency is increased the dither amplitude ratio decreases to a very small value. While a large dither is obviously unacceptable, experience has shown that small amplitude load motion at a carrier frequency may improve overall control system efficiency by reducing the frictional forces which have to be overcome to reposition the control mechanism in response to varying input command signals.

SUMMARY OF THE INVENTION

The present invention constitutes an improvement over the prior art, as exemplified by the above referenced patents, by permitting the application of time modulated position control mechanisms to low inertia loads wherein the range of natural frequencies of the load and control mechanism is too high to permit operation with a super-critical carrier frequency. In accordance with the invention a carrier frequency is selected to lie in a range defined by the control dynamics and resonant frequency range. Thus, a carrier frequency less than the minimum critical or natural frequency but greater than the maximum control signal frequency is employed in a time modulated position control. The carrier frequency may also be selected to provide an acceptable dither amplitude ratio.

BRIEF DESCRIPTION OF THE DRAWING

The present invention may be better understood and its numerous objects and advantages will become apparent to those skilled in the art by reference to the accompanying drawing which is a schematic diagram, partly in cross-section, of a control mechanism which may be employed in the practice of the present invention.

DESCRIPTION OF THE PREFERRED EMBODIMENT

Before discussing the technique of the present invention in detail, a brief description of exemplary hardware with which the invention may be employed is believed warranted. In the open loop embodiment of the drawing an input command signal, $T_c$, and the carrier signal, $f_c$, are applied to a conventional summing amplifier 10. Amplifier 10 is supplied with power from a suitable source, not shown. In amplifier 10 the command signal is employed to modulate the carrier signal to produce a single output control signal; this control signal being a composite of the carrier and command signal inputs. The alternating output signal of amplifier 10 is applied to an electronic switch 12; switch 12 being connected to a further power source which has also been omitted from the drawing in the interest of clarity. The delivery of energizing current for a solenoid 14 from this further power source is controlled by switch 12 in response to the composite output signal of amplifier 10.

The operation of switch 12 is such that the switch closes upon receipt of a control signal having a magnitude equal to or above a threshold level. Conversely, switch 12 is opened when the magnitude of the output of amplifier 10 is below the preselected threshold value. Thus, switch 12 provides energizing current to solenoid 14 in an on-off or step function mode of operation. The frequency of the current pulses received by solenoid 14 is dependent upon the frequency of the carrier signal $f_c$.

The duration of the energizing current pulses delivered to solenoid 14 is dependent upon the modulation of the carrier signal provided by the magnitude of the input command signal $T_c$.

Fluid at a supply pressure $P_s$ from a suitable supply, not shown, is delivered to an actuator mechanism associated with solenoid 14 via an inlet connector-conduit 16. Conduit 16 is in constant communication with an upstream orifice $A_u$ by means of an interconnecting annulus 18 and passageway 20. The pressurized fluid is also delivered to the interior of a cylinder 22, via an interconnecting passageway 24, at the smaller area end of a differential piston 26.

A control valve housing, indicated generally at 28, is mounted in a bore within the actuator body as shown. A housing 30 for the solenoid 14 is also mounted on the actuator body so as to position an extension 32 of the solenoid plunger in operative relationship with a ball valve 36 in valve housing 28. When solenoid 14 is energized by switch 12 the solenoid plunger will be retracted thus compressing a spring 38. Retraction of the solenoid plunger causes the extension 32 thereof to move to the left as the device is shown. This movement permits the ball valve member 36 to move from its normal spring loaded position, where it is in sealing engagement with upstream orifice $A_u$, to a second position where it is in sealing engagement with a downstream or discharge orifice $A_d$; the movement of ball 36 to the left being under the influence of the pressure applied to passageway 20 from the inlet conduit 16. The retraction of ball 36 permits the pressurized fluid to flow through orifice $A_u$ and, via valve chamber 40 and passageway 42, into the cylinder 22 at the larger area side of piston 26. The fluid pressure, with solenoid 14 energized, will cause ball 36 to be seated against orifice $A_d$.

When solenoid 14 is deenergized spring 38 urges the solenoid plunger and its extension 32 to the right as shown in the figure whereby the ball valve 36 is reseated against the inlet orifice $A_u$. The reseating of the ball valve upon deenergization of solenoid 14 will reestablish communication between cylinder 22, at the large area end of piston 26, and a vent passage 46 via passageway 42, valve chamber 40, downstream orifice $A_d$, chamber 48 and annulus 50.

For the following explanation it will be presumed that the ratio of the exhaust area $A_d$ to the inlet area $A_u$ is fixed at 2.0 and the dynamic movement of ball 36 between the opposite valve seats will establish a quasi steady-state condition. Under such conditions, and further presuming that actuator 26 is a half area piston, the magnitude of the pressure in cylinder 22 at the large area end of the piston will be 0.5 $P_s$ at the quasi steady-state null condition. The area of piston 26 subjected to the constant supply pressure $P_s$ via passageway 24 is thus one-half the area of the piston which faces the chamber which is subjected to the modulated supply pressure resulting from the periodic energization of solenoid 14. When a pressure of magnitude exactly 0.5 $P_s$ is impressed upon the larger area end of piston 26, and a quasi steady-state condition exists, a null condition of output piston 26 exists. The modulation of the carrier signal by the input command signal can result in a modulated pressure in cylinder 22 at the larger area side of piston 26 less than 0.5 $P_s$ such that axial motion of output piston 26 to the left results. Conversely, the input command signal can also modulate the carrier signal to produce a modulated pressure in cylinder 22 which is greater than 0.5 $P_s$ thereby causing the piston 26 to move to the right. Hence, the magnitude of the input command signal modulates the carrier signal to produce bi-directional movement of the actuator piston depending upon the degree of modulation which, in turn, is dependent upon the magnitude of the input command signal. However, due to the existence of the carrier, there will at all times be a small amplitude pressure variation imposed on the large area side of piston 26 to produce a small amplitude load motion; i.e., dither; at the carrier frequency.

The principals for selecting a super-critical carrier frequency for a time modulated pneumatically actuated control mechanism are fully set forth in referenced U.S. Pat. Nos. 3,430,536 and 3,521,535. Thus, in U.S. Pat. No. 3,430,536, FIG. 7 depicts a typical analysis of dither amplitude ratio versus carrier frequency. The curves of FIG. 7 of the referenced patent are typical of a system where the pneumatic time constant is small relative to the natural frequency range; this being the case most often encountered in the prior art. Classically, the pneumatic time constant, $\tau$, is defined as:

$$\tau = \frac{V}{\gamma C_f R \sqrt{T} A}$$

where:
$V$ = volume in in.$^3$
$\gamma$ = ratio of specific heats
$C_f$ = mass flow coefficient in $$\frac{lbm \sqrt{R.°}}{lbf \; sec}$$

and is expressed as:

$$C_f = \sqrt{\frac{g\gamma}{R} \left(\frac{2}{\gamma + 1}\right)^{\frac{\gamma+1}{\gamma-1}}}$$

and where:
R = gas constant in ft − lbf/lbm − ° R.
T = absolute temperature in ° R.
g = gravitational constant in ft − lbf/lbm − sec$^2$
and,
A = effective orifice area in in.$^2$ The effective orifice area, A, may be either the upstream orifice area, $A_u$, for the charging time constant or the downstream orifice, $A_d$, for the discharging time constant. Since the orifice area ratio, $A_d/A_u$, is usually prescribed, only the value of one of the time constants is given as an index. This is generally the charging time constant, $\tau_u$, where:

$$\tau_u = \frac{V}{\gamma C_f R \sqrt{T} A_u}$$

The pneumatic time constant $\tau_u$ is a direct indication of the rate of change of pressure with time in an actuator and as such as one of the classical indexes of the dynamic capability of a pneumatic control mechanism. For a given application, with the particular gas and the temperature range defined, the time constant can be varied by changing the inlet orifice area, $A_u$; the time constant increasing with decreasing $A_u$. The larger the time constant the slower the time rate of exchange of pressure in the actuator. The curves of FIG. 7 of U.S. Pat. No. 3,430,536 will shift downwardly with increasing time constant for the same range of spring rates; an aerodynamic load being approximated by a spring; representing the lower values of dither amplitude ratio. Additionally, with increasing $\tau_u$, the characteristic dip shown with increasing carrier frequency would occur sooner and dip further before the system was influenced by its natural frequency for that operating condition. Thus, it would initially appear that the dither amplitude ratio range may be depressed to an acceptable level by making the relative time constant sufficiently large thereby enabling use of a sub-critical carrier frequency. However, such a pneumatic time constant increase would, in most cases, make the system incapable of meeting its other dynamic requirements and thus those skilled in the art have universally believed that a super-critical carrier frequency was required.

If the same operating range as depicted in FIG. 7 of U.S. Pat. No. 3,430,536 pertains but the inertia of the load attached to the control mechanism, the control fins of a missile for example, is significantly reduced, performance of the system would be essentially as presented in FIG. 7 of U.S. Pat. No. 3,430,536 at each load spring rate at low frequencies up to the dip shown in the curves. However, since the system natural frequency has been substantially increased as assumed by the reduction in the load inertia, the attenuation of the dither amplitude ratio which began at the dip in each curve will continue strongly since it is not immediately influenced by the natural frequency as shown for the case in FIG. 7 of U.S. Pat. No. 3,430,536. This attenuation is due to the natural decrease in pressure amplitude in the actuator with increasing carrier frequency. In fact, because of friction, it is possible for the dither amplitude to completely attenuate at a carrier frequency lower than the natural frequency. This, however, would usually be an undesirable condition since with a completely attenuated dither amplitude the pressure amplitude in the actuator may be inadequate to overcome the coulomb friction of the control. In general, however, if the dither amplitude has not completely attenuated as the natural frequency for the operation condition is approached undesirable peaking will occur.

In accordance with the present invention it has been discovered that the operational characteristics of a fluidic control mechanism as represented by the curves of FIG. 7 of U.S. Pat. No. 3,430,536 may be approached from the viewpoint that the existing actuator time constant is appropriate for the dynamic requirements of the control and, when the natural frequency range is suitably high relative to the pneumatic time constant of the system, the natural decrease in pressure amplitude in the actuator and hence attenuation of the output dither with carrier frequency can result in a dither amplitude range which is acceptably small before the critical frequency range; i.e., a subcritical carrier may be selected. This sub-critical carrier must, however, be at a frequency which is above the primary band width of the system; i.e., the band of frequencies of the input command signals which are determined by the system load dynamics in the manner described in the discussion of FIG. 6 of U.S. Pat. No. 3,430,536.

Thus, to summarize the present invention, a method for the operation of time modulated pneumatically actuated control mechanisms associated with loads having a comparatively low inertia and thus comparatively high resonant frequency range has been provided. In accordance with the present invention a sub-critical carrier frequency; i.e., a frequency below the lowest critical frequency of the control mechanism and its load, is employed. The carrier frequency is, however, further selected to be above the primary band width of the control system. The carrier frequency may be further selected so as to provide a dither amplitude sufficient to overcome the coulomb friction of the control and having an acceptable dither amplitude ratio range.

While a preferred embodiment has been shown and described various modifications and substitutions may be made thereto without departing from the spirit and scope of the invention. Accordingly, it is to be understood that the present invention has been described by way of illustration and not limitation.

What is claimed is:

1. A time modulated fluid actuated control apparatus comprising:

housing means, said housing means defining a cylinder;

actuator piston means disposed in said housing means cylinder, said piston means including an output member adapted to be connected to a movable load, said load and control apparatus defining a system having a range of resonant frequencies;

solenoid operated valve means mounted on said housing means, said valve means being selectively operable to deliver pressurized fluid to and to vent fluid from said housing means cylinder at one side of said piston means;

means for generating variable input command signals commensurate with the desired position of the load, said command signals being characterized by a dynamic frequency range below said range of said resonant frequencies;

means for generating a signal at a carrier frequency, said carrier frequency being greater than the maximum dynamic command signal frequency and less than the minimum system resonant frequency;

means for modulating said carrier frequency signal by said command signal; and means responsive to said modulated carrier frequency signal for controlling energization of said solenoid operated valve means.

2. The method for the control of a pneumatic position control mechanism employing an expansible chamber motor having an output shaft coupled to a movable load, said method comprising the steps of:

generating a command signal commensurate with the desired position of the movable load coupled to the control mechanism motor output shaft, the frequency of the command signals being within a range determined by the primary band width of the actuator system including the control mechanism and the load;

generating a carrier signal at a frequency less than the minimum resonant frequency of the actuator system and greater than the maximum command signal frequency;

modulating the carrier frequency signal with a command signal;

and controlling the delivery of pressurized gas to the position control mechanism expansible chamber motor in accordance with the magnitude of the modulated carrier frequency signal.

3. The method of claim 2 wherein the step of selecting the carrier frequency further comprises:
   selecting a carrier frequency which will provide a dither amplitude sufficient to overcome the coulomb friction of the actuator system.

4. The method of claim 2 wherein the step of generating command signals includes:
   determining the range of resonant frequencies of the actuator system;
   determining the primary band width of the actuator system;
   and
   causing generation of variable amplitude command signals within the primary band width.

5. The method of claim 3 wherein the step of generating command signals includes:
   determining the range of resonant frequencies of the actuator system;
   determining the primary band width of the actuator system;
   and
   causing generation of variable amplitude command signals within the primary band width.

* * * * *